(12) United States Patent
Wang

(10) Patent No.: US 9,972,220 B2
(45) Date of Patent: May 15, 2018

(54) OMNIDIRECTIONAL NECK ASSEMBLY FOR CRASH TEST DUMMY

(71) Applicant: Humanetics Innovative Solutions, Inc., Plymouth, MI (US)

(72) Inventor: Zhenwen Jerry Wang, Farmington Hills, MI (US)

(73) Assignee: HUMANETICS INNOVATIVE SOLUTIONS, INC., Farmington Hills, MI (US)

( * ) Notice: Subject to any disclaimer, the term of this patent is extended or adjusted under 35 U.S.C. 154(b) by 200 days.

(21) Appl. No.: 14/981,034

(22) Filed: Dec. 28, 2015

(65) Prior Publication Data

US 2016/0189571 A1    Jun. 30, 2016

Related U.S. Application Data

(60) Provisional application No. 62/098,363, filed on Dec. 31, 2014.

(51) Int. Cl.
*G09B 23/28* (2006.01)
*G09B 23/32* (2006.01)

(52) U.S. Cl.
CPC .................... *G09B 23/32* (2013.01)

(58) Field of Classification Search
USPC ............... 434/262, 267, 274; 72/172, 866.4
See application file for complete search history.

(56) References Cited

U.S. PATENT DOCUMENTS

| | | | | |
|---|---|---|---|---|
| 979,147 A | * | 12/1910 | Fryette | G09B 23/32 434/274 |
| 2,108,229 A | * | 2/1938 | Metz | G09B 23/32 434/274 |
| 3,740,871 A | | 6/1973 | Berton et al. | |
| 3,753,301 A | | 8/1973 | Daniel et al. | |
| 3,762,069 A | * | 10/1973 | Culver | G09B 23/32 434/274 |
| 3,877,156 A | | 4/1975 | Itoh | |
| 3,962,801 A | * | 6/1976 | Gonzalez | G09B 23/32 434/274 |
| 4,200,995 A | * | 5/1980 | Trella | G09B 23/34 434/274 |
| 4,261,113 A | | 4/1981 | Alderson | |
| 4,488,433 A | | 12/1984 | Denton et al. | |

(Continued)

FOREIGN PATENT DOCUMENTS

| | | |
|---|---|---|
| DE | 2330093 | 1/1974 |
| DE | 4012691 A1 | 10/1990 |

(Continued)

OTHER PUBLICATIONS

European Search Report dated Mar. 22, 2016 for European Application No. EP 15 20 3042.

(Continued)

*Primary Examiner* — Kurt Fernstrom
(74) *Attorney, Agent, or Firm* — Howard & Howard Attorneys PLLC

(57) ABSTRACT

An omnidirectional neck assembly for a crash test dummy includes a plurality of vertebra discs, a plurality of ligament joints each having a joint element disposed between the vertebra discs, the vertebra discs having a profile that can simulate angles of a human neck in all directions.

19 Claims, 5 Drawing Sheets

(56) References Cited

U.S. PATENT DOCUMENTS

| | | | |
|---|---|---|---|
| 4,872,841 A * | 10/1989 | Hamilton | G09B 23/30 |
| | | | 434/274 |
| 4,948,373 A | 8/1990 | Engels | |
| 5,018,977 A | 5/1991 | Wiley et al. | |
| 5,152,692 A | 10/1992 | Richards | |
| 5,317,931 A | 6/1994 | Kalami | |
| 5,526,707 A | 6/1996 | Smrcka | |
| 5,528,943 A | 6/1996 | Smrcka et al. | |
| 5,589,651 A | 12/1996 | Viano et al. | |
| 5,665,922 A | 9/1997 | Tsukada et al. | |
| 5,672,059 A * | 9/1997 | Browne-Wilkinson | G09B 23/34 |
| | | | 434/274 |
| 5,741,989 A | 4/1998 | Viano et al. | |
| 6,422,874 B1 | 7/2002 | Green et al. | |
| 6,439,070 B1 | 8/2002 | Beebe et al. | |
| 6,447,518 B1 | 9/2002 | Krause et al. | |
| 6,749,433 B2 | 6/2004 | Kassai et al. | |
| 6,982,409 B2 | 1/2006 | Huang et al. | |
| 7,086,273 B2 | 8/2006 | Lipmyer | |
| 7,878,080 B2 | 2/2011 | Hwang et al. | |
| RE42,418 E | 6/2011 | Lipmyer | |
| 8,840,404 B2 | 9/2014 | Arthur et al. | |
| 2004/0029090 A1 | 2/2004 | Kassai et al. | |
| 2005/0126258 A1 | 6/2005 | Lipmyer | |
| 2009/0025492 A1 | 1/2009 | Hwang et al. | |
| 2013/0000426 A1 | 1/2013 | Arthur et al. | |
| 2013/0213155 A1 | 8/2013 | Ozawa | |
| 2013/0252220 A1 * | 9/2013 | Wang | G09B 23/32 |
| | | | 434/274 |
| 2013/0327164 A1 | 12/2013 | Wang | |
| 2014/0190279 A1 | 7/2014 | Been et al. | |
| 2014/0190280 A1 | 7/2014 | Been et al. | |
| 2014/0294485 A1 | 10/2014 | McInnis et al. | |
| 2015/0086957 A1 | 3/2015 | Gibbs et al. | |

FOREIGN PATENT DOCUMENTS

| | | |
|---|---|---|
| DE | 4117046 A1 | 11/1991 |
| DE | 10215640 A1 | 11/2003 |
| DE | 102004058022 A1 | 6/2005 |
| DE | 102004058022 B4 | 12/2007 |
| DE | 102007062761 B4 | 9/2013 |
| DE | 102013009815 A1 | 12/2013 |
| EP | 0709665 A2 | 5/1996 |
| EP | 1388833 A1 | 2/2004 |
| EP | 1388833 B1 | 9/2009 |
| EP | 1388833 B8 | 11/2009 |
| FR | 2018158 | 5/1970 |
| FR | 1503956 | 3/1978 |
| FR | 2646266 A1 | 10/1990 |
| GB | 2231433 A | 11/1990 |
| GB | 2244843 A | 12/1991 |
| GB | 2231433 B | 5/1993 |
| GB | 2244843 B | 4/1994 |
| GB | 2344922 A | 6/2000 |
| JP | 50114835 | 9/1975 |
| JP | 2005227266 A | 8/2005 |
| JP | 2012202708 A | 10/2012 |
| JP | 2013257322 A | 12/2013 |
| JP | 5664391 B2 | 2/2015 |
| WO | 9830995 | 7/1998 |
| WO | 9847122 | 10/1998 |
| WO | 2012044225 A1 | 4/2012 |

OTHER PUBLICATIONS

Huang et al., "Development of an Advanced Head/Neck System for 5th Percentile Female Anthropomorphic Test Dummies", Jan. 1, 2002, XP055257963, retrieved from the internet: URL:http://www-nrd.nhtsa.dot.gov/pdf/bio/Proceedings/2002_30/30-6.pdf, pp. 63-76.

Hu et al., "Head-Neck Finite Element Model of the Crash Test Dummy THOR", International Journal of Crashworthiness, Woodhead Publishing, CA, vol. 9, No. 2, Mar. 1, 2004, pp. 175-186, XP019384752, ISSN: 1573-8965.

European Office Action (EP Pat. Appln. No. 15 203 042.5; dated: Jan. 16, 2018.

* cited by examiner

OMNIDIRECTIONAL NECK ASSEMBLY FOR CRASH TEST DUMMY

CROSS-REFERENCE TO RELATED APPLICATION(S)

The present application claims priority to and all the benefits of U.S. Provisional Patent Application No. 62/098,363, filed Dec. 31, 2014, which is expressly incorporated herein by reference in its entirety.

BACKGROUND OF THE INVENTION

1. Field of the Invention

The present invention relates generally to Anthropomorphic Test Devices (ATD) and, more particularly, to an omnidirectional neck assembly for an ATD that can be used to assess and predict injuries under crash, under body explosive, and aerospace ejection seat testing environments.

2. Description of the Related Art

Automotive, aviation, military, and other vehicle manufacturers conduct a wide variety of collision, ejection and under-body-blast (UBB) testing to measure the effects of an impact upon a vehicle and its occupants. Through the testing, a vehicle manufacturer gains valuable information that can be used to improve the impact worthiness of the vehicle.

Impact testing often involves the use of anthropomorphic test devices, better known as "crash test dummies." During the testing, an operator places a crash test dummy inside a vehicle, and the vehicle undergoes a simulated collision, UBB, or ejection. The testing exposes the crash test dummy to high inertial loading, and sensors inside the crash test dummy, such as load cells, displacement sensors, accelerometers, pressure gauges, angle rate sensors, and the like, generate electrical signals of data corresponding to the loading. Cables or wires transmit these electrical signals of data to a data acquisition system (DAS) for subsequent processing. This data reveals information about the effects of the impact on the crash test dummy and can be correlated to the effects a similar impact would have on a human occupant.

In order to obtain more accurate test data, test engineers attempt to maximize what is known as the "biofidelity" of the crash test dummy. Biofidelity is a measure of how well the crash test dummy reacts like a human being in a vehicle impact test environment. A crash test dummy reacting as an actual human during a collision is said to have a high biofidelity. Accordingly, a crash test dummy having a high biofidelity will provide more accurate information from a collision test relative to the effect of the collision on a human being. Thus, ATD engineers design crash test dummies with the proper anthropometry that reflects a total weight, center of gravity, mass moment of inertia and range of motion similar to that of a human body so as to increase the biofidelity of the crash test dummy.

It is known to provide a neck for a crash test dummy. In one crash test dummy, the neck has a cylindrical design with grooves around the neck. A groove depth and angle are used to control a performance of the neck. While this neck provides good flexion and rear extension performance, it lacks the ability to adjust a lateral performance. In another crash test dummy, the neck has good lateral performance, but its flexion and extension performance were not so good and cannot be adjusted easily due to its axial symmetrical mechanical design.

From a biomechanics research study, a human neck has different performance in forward flexion and lateral bending. The bending stiffness are similar between the two directions up to a certain angles, where the frontal and lateral bending start to differentiate each other. For example, a $5^{th}$ percentile female neck performance is shown in FIGS. 2 and 3. The slopes of the biofidelity response curves are approximately 0.58 in both directions (approximated in the thin dotted line in FIG. 3). However, when forward flexion reaches eighty degrees (80°) bending, the neck bottoms out and the stiffness increases quickly (approximated in the thin dotted line in FIG. 2). For lateral bending, the neck bottoms out near fifty degrees (50°).

Thus, it has been difficult to replicate a human neck for a crash test dummy. In particular, a neck was needed to be developed to be unique for frontal impact dummies or side impact dummies due to different responses in each direction. As a result, it is desirable to develop a neck for a crash test dummy that can perform like a human neck in both frontal and lateral bending directions. Therefore, there is a need in the art to provide a neck assembly for use in a crash test dummy so that biofidelity of the crash test dummy is improved.

SUMMARY OF THE INVENTION

Accordingly, the present invention provides an omnidirectional neck assembly for a crash test dummy. The omnidirectional neck assembly includes a plurality of vertebra discs. The omnidirectional neck assembly also includes a plurality of ligament joints each having a joint element disposed between the vertebra discs. The vertebra discs have a profile that can simulate angles of a human neck in all directions.

In addition, the present invention provides a crash test dummy including a body and an omnidirectional neck assembly connected to the body. The omnidirectional neck assembly includes a plurality of vertebra discs and a plurality of ligament joints each having a joint element with the vertebra discs having a profile that can simulate angles of a human neck in all directions.

One advantage of the present invention is that an omnidirectional neck assembly is provided for a crash test dummy. Another advantage of the present invention is that the omnidirectional neck assembly for a crash test dummy can simulate a human neck's biomechanical performance. Yet another advantage of the present invention is that the omnidirectional neck assembly for a crash test dummy simulates a human neck in all directions. Still another advantage of the present invention is that the omnidirectional neck assembly for a crash test dummy allows different performances such as flexion, extension, and lateral bending. A further advantage of the present invention is that the omnidirectional neck assembly for a crash test dummy follows a human neck vertebra curvature driving posture. Yet a further advantage of the present invention is that the omnidirectional neck assembly for a crash test dummy includes inserts having a profile that reduces the amount of neck lateral rotation for early bottoming out. A still further advantage of the present invention is that the omnidirectional neck assembly for a crash test dummy includes inserts having a tunable profile that allows the neck to perform differently in flexion and lateral bending.

Other features and advantages of the present invention will be readily appreciated, as the same becomes better understood, after reading the subsequent description taken in conjunction with the accompanying drawings.

DESCRIPTION OF THE PREFERRED EMBODIMENT(S)

Figure 1:
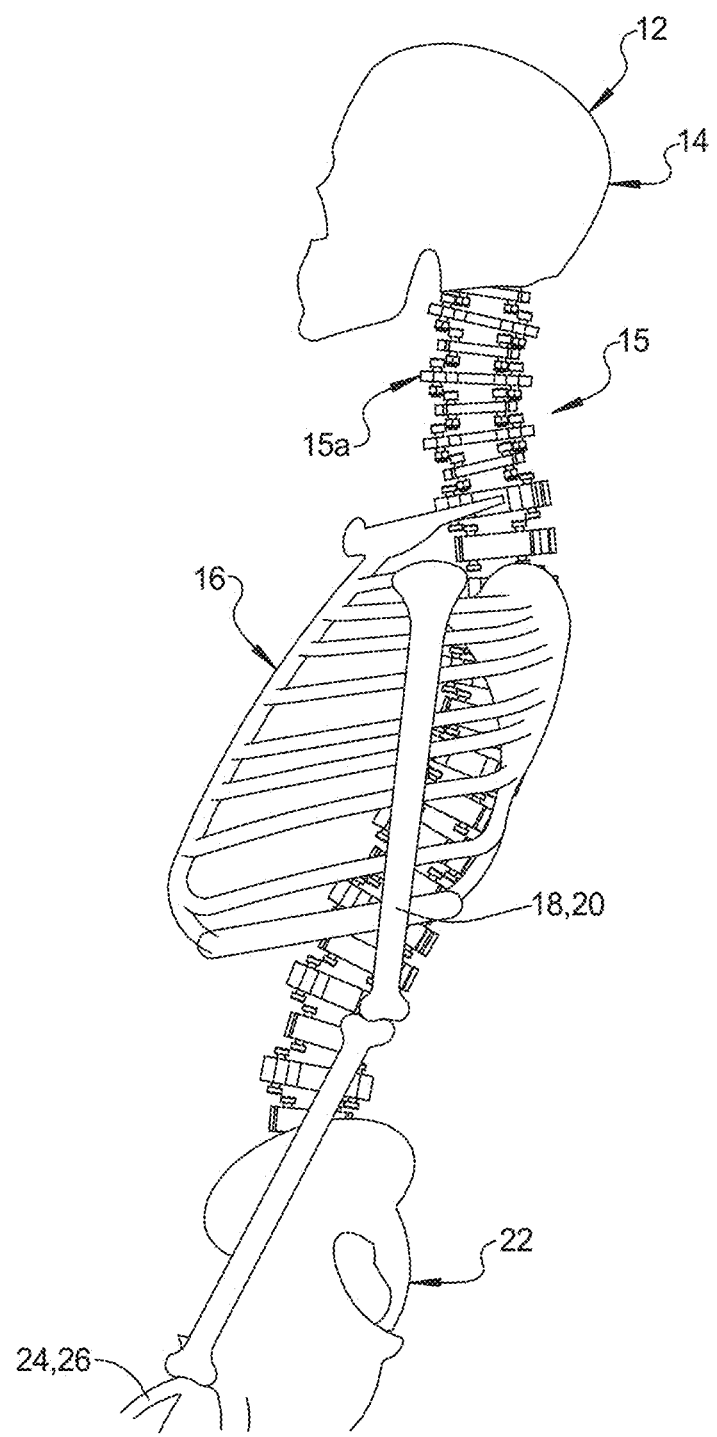
FIG. 1 is an elevational view of a skeletal representation of a crash test dummy known in the art.
Figure 2:
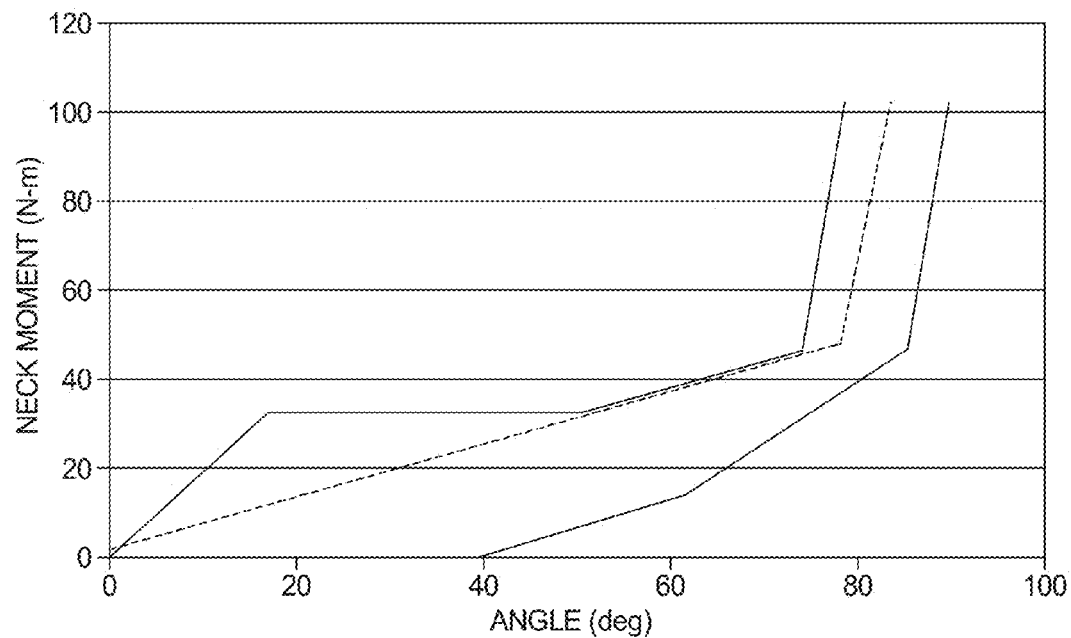
FIG. 2 is a graphical view of neck moment versus angle for a fifth percentile female crash test dummy illustrating forward extension moment-angle response.
Figure 3:
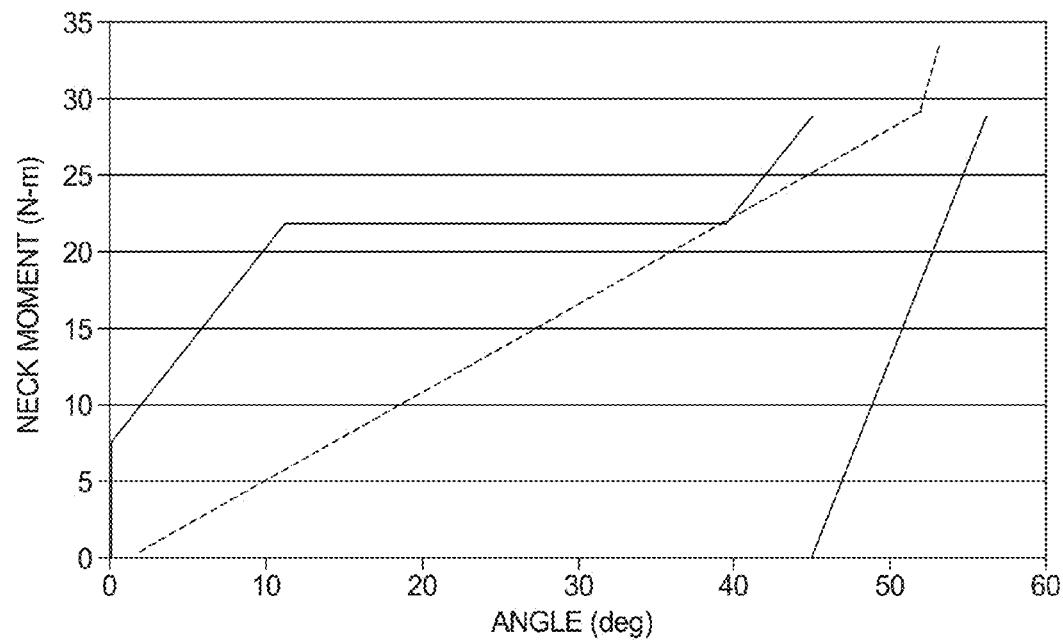
FIG. 3 is a graphical view of neck moment versus angle for a fifth percentile female crash test dummy illustrating lateral flexion moment-angle response.

Referring to the drawings and in particular FIG. 1, one embodiment of a crash test dummy, is generally indicated at 12. The crash test dummy 12 is of a fifth percentile (5%) female type and is illustrated in a standing position. This crash test dummy 12 is used primarily to test the performance of automotive interiors and restraint systems for adult front and rear seat occupants. The size and weight of the crash test dummy 12 are based on anthropometric studies, which are typically done separately by the following organizations, University of Michigan Transportation Research Institute (UMTRI), U.S. Military Anthropometry Survey (ANSUR), and Civilian American and European Surface Anthropometry Resource (CESAR). It should be appreciated that ranges of motions, centers of gravity, and segment masses simulate those of human subjects defined by the anthropometric data.

As illustrated in FIG. 1, the crash test dummy 12 includes a head assembly 14, which includes a one-piece plastic skull, an instrumentation core, and a vinyl skin. The instrumentation core is removable for access to head instrumentation contained inside the head assembly 14.

The crash test dummy 12 also includes a spine assembly 15 having a neck assembly 15a with an upper end mounted to the head assembly 14 by a nodding block (not shown) and a nodding joint (not shown) of the spine assembly 15. The neck assembly 15a has a lower end extending into a torso area of the crash test dummy 12 and is connected to a spine mounting weldment (not shown) by an adapter assembly (not shown). The spine assembly 15 extends downwardly to a pelvis assembly 22 to be described.

The torso area of the crash test dummy 12 includes a rib cage assembly 16 connected to the spine assembly 15. The crash test dummy 12 also includes a pair of arm assemblies including a right arm assembly 18 and a left arm assembly 20, which are attached to the crash test dummy 12. The left arm assembly 20 includes a clavicle link (not shown), which connects a clavicle (not shown) to the top of the spine assembly 15. It should be appreciated that the right arm assembly 18 is constructed in a similar manner.

As illustrated in the FIG. 1, a lower end of the lumbar spine of the spine assembly 15 is connected to a lumbar-thoracic adapter (not shown), which is connected to a lumbar to pelvic adapter (not shown). The crash test dummy 12 also includes a pelvis assembly 22 connected to the adapter. The crash test dummy 12 includes a right leg assembly 24 and a left leg assembly 26, which are attached to the pelvis assembly 22. It should be appreciated that various components of the crash test dummy 12 are covered in a urethane skin such as a flesh and skin assembly (not shown) for improved coupling with the skeleton of the crash test dummy 12. It should also be appreciated that a lifting ring (not shown) may be attached to the head assembly 14 for lifting the crash test dummy 12 into and out of test fixtures and vehicles.

Figure 4A:
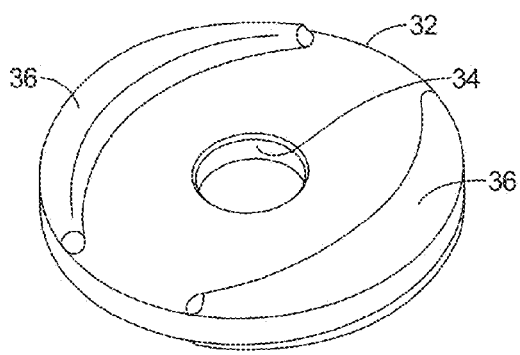
FIG. 4A is a perspective view of an insert for the omnidirectional neck assembly of FIG. 4.
Figure 4:
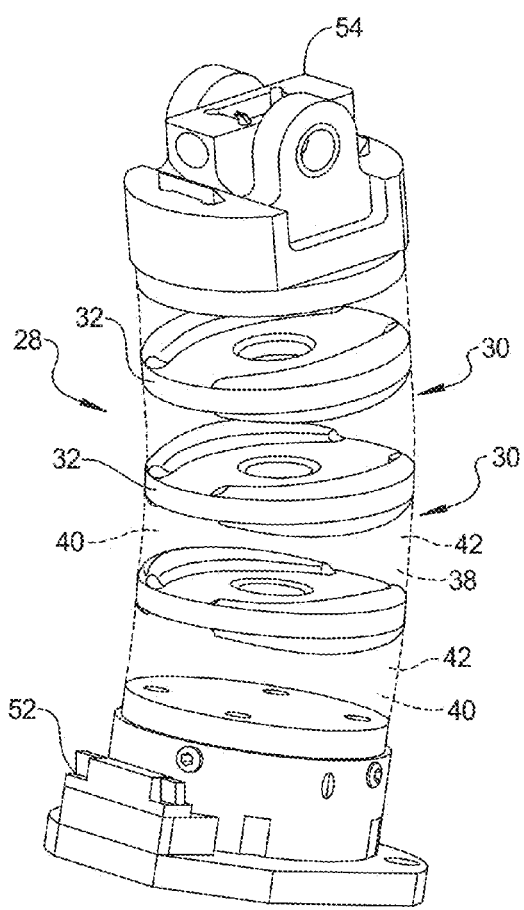
FIG. 4 is a perspective view of an omnidirectional neck assembly, according to the present invention, for a neck assembly of the crash test dummy of FIG. 1.
Figure 4B:
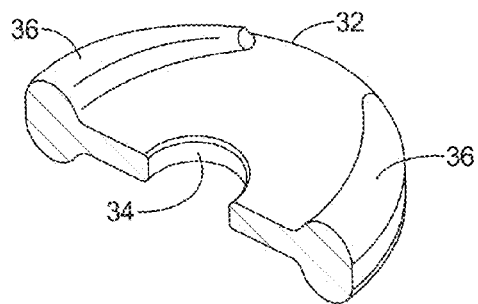
FIG. 4B is a cross-sectional view of the insert of FIG. 4A.
Figure 5A:
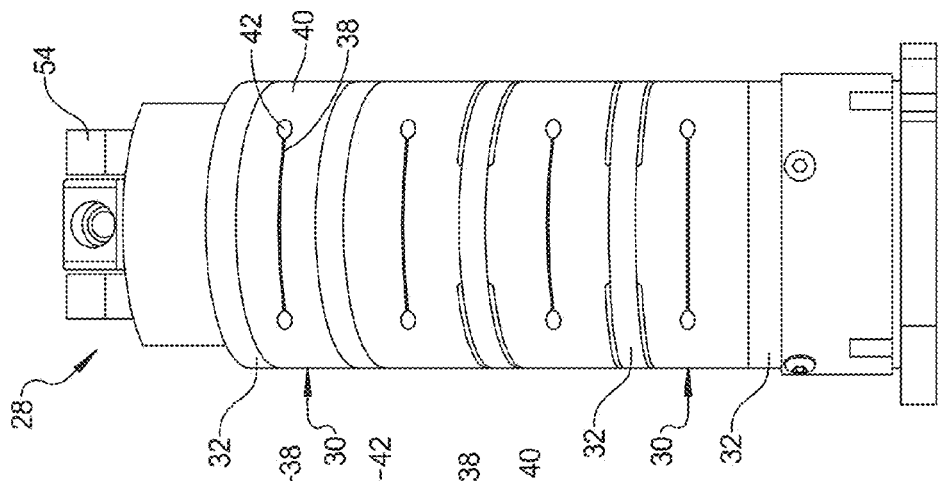
FIG. 5A is a side elevational view of the omnidirectional neck assembly of FIG. 4.
Figure 5B:
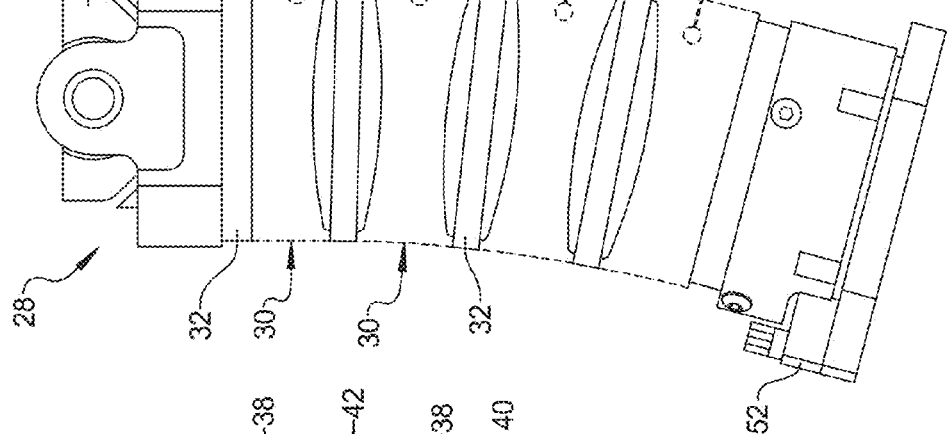
FIG. 5B is another side elevational view of the omnidirectional neck assembly of FIG. 4.
Figure 5C:
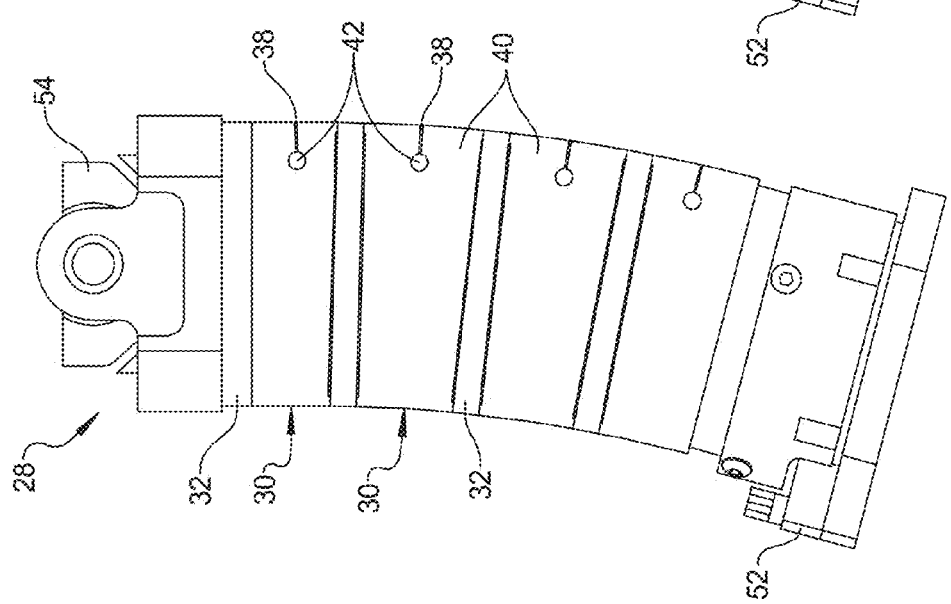
FIG. 5C is a front elevational view of the omnidirectional neck assembly of FIG. 4.

Referring to FIG. 4, one embodiment of an omnidirectional neck assembly 28, according to the present invention, is shown to replace the neck assembly 15a for the crash test dummy 12. The omnidirectional neck assembly 28 represents a human neck. The omnidirectional neck assembly 28 includes a plurality of modular vertebra segments, generally indicated at 30. In the embodiment illustrated, the omnidirectional neck assembly 28 has four (4) cervical spine vertebra segments 30. As illustrated in FIGS. 4, 4A, and 4B, each vertebra segment 30 includes a vertebra disc 32 having a height or thickness corresponding to its location in the cervical of the neck assembly 28. In one embodiment, the vertebra disc 32 is made of a relatively rigid material such as metal or plastic. The vertebra disc 32 includes at least one aperture 34 extending axially therethrough. In the embodiment illustrated, the aperture 34 is centrally located within the vertebra disc 32. The vertebra disc 32 is generally circular in shape, but may be any suitable shape to simulate a human neck. The vertebra disc 32 has one or more raised portions 36 on at least one side thereof. In the embodiment illustrated, the vertebra disc 32 has a pair of opposed raised portions 36 on both sides thereof. The raised portions 36 are generally arcuate in shape. The raised portions 36 have a varying height with a greatest height in a middle thereof and reducing in height to the ends thereof. It should be appreciated that the raised portions 36 of the vertebra disc 32 will be located on the sides of the neck assembly 28.

Referring to FIGS. 4 and 5A through 5C, each vertebra segment 30 includes a ligament joint 38 disposed between adjacent vertebra discs 32. In the embodiment illustrated, one ligament joint 38 is disposed between a pair of vertebra discs 32. As illustrated, each ligament joint 38 has a joint element 40 disposed between a pair of the vertebra discs 32. The joint element 40 is made of a flexible material such as an elastomeric material, for example, rubber. The joint element 40 is connected to an upper vertebra disc 32 and a lower vertebra disc 32 via a suitable mechanism such as an adhesive. It should be appreciated that each ligament joint 38 is integral and one-piece.

The joint element 40 includes a cutout 42 on a front side to soften the neck assembly 28 to meet the extension performance for different spine curvature. The stiffness of the human neck rearward extensions is typically softer than that of its forward flexion. The cutouts 42 are located on a front side of the neck assembly 28 in the joint element 40 between the vertebra discs 32. In the embodiment illustrated, the cutouts 42 are a round cylindrical cavity, which is molded into the joint element 40, but may be any suitable shape. In one embodiment, a shape blade can be used to cut a through round hole as illustrated in FIG. 4. This process is to facilitate rubber manufacturing and also improve the durability of the neck assembly 28. It should be appreciated that the mold hole will prevent rubber tearing during testing. It should also be appreciated that, with this feature, the forward neck flexion performance would remain the same due to the compression on the front side of the neck assembly 28. It should further be appreciated that, for extension, the side with stiffness reduction will be in tension, the cutouts 42 will open up and therefore reduce the amount of materials engaged in bending. It should still further be appreciated that the stiffness is reduced accordingly.

Figure 6:
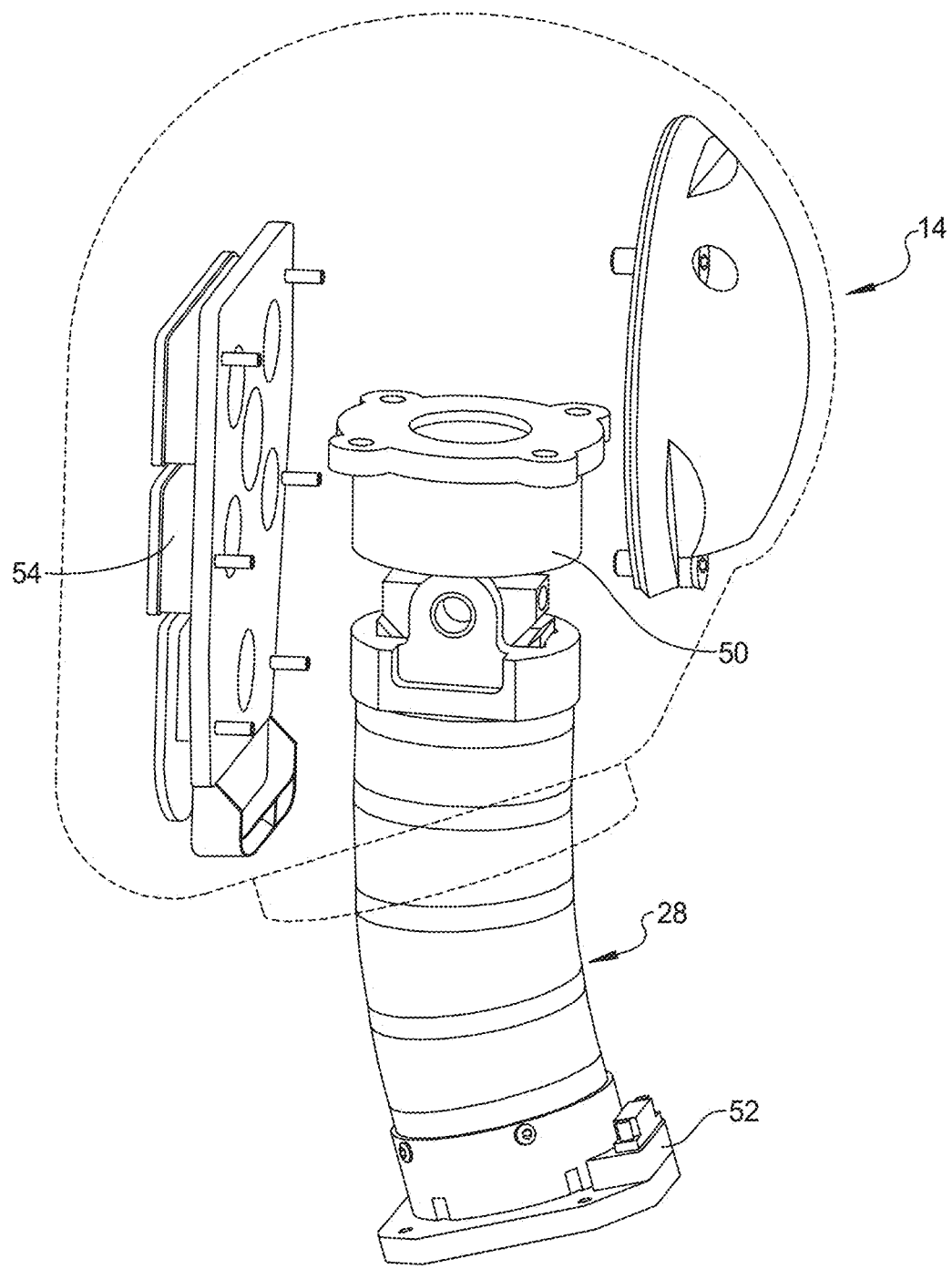
FIG. 6 is a side elevational view of the omnidirectional neck assembly of FIGS. 4 through 5C illustrated with a head assembly of the crash test dummy of FIG. 1.

Referring to FIG. 6, the omnidirectional neck assembly 28 and head assembly 14 is shown. Due to the modular vertebra segments 30, the neck assembly 28 can include an upper neck load cell or transducer 50 and a lower neck load cell or transducer 52 to measure forces and moments that are transferred between the vertebra discs 32. The head assembly 14 can also include a facial load cell or transducer 54 to measure forces on the face of the head assembly 14. It should be appreciated that, in one embodiment, the load cells 50 and 52 are six (6) axis load cells and the load cell 54 is a single axis load cell.

The present invention has been described in an illustrative manner. It is to be understood that the terminology, which has been used, is intended to be in the nature of words of description rather than of limitation.

Many modifications and variations of the present invention are possible in light of the above teachings. Therefore, the present invention may be practiced other than as specifically described.

What is claimed is:

1. An omnidirectional neck assembly for a crash test dummy comprising:
    a plurality of vertebra discs;
    a plurality of ligament joints each having a joint element disposed between said vertebra discs; and
    each of said vertebra discs having at least one raised portion on at least one side thereof with two ends being open ended to define a profile that can simulate angles of a human neck in all directions and said joint element being seated upon said at least one raised portion.

2. An omnidirectional neck assembly as set forth in claim 1 wherein said at least one raised portion is generally arcuate in shape.

3. An omnidirectional neck assembly as set forth in claim 1 wherein said profile varies in height with a greatest height being in a middle thereof and reducing in height toward ends thereof.

4. An omnidirectional neck assembly as set forth in claim 1 wherein each of said vertebra discs include a pair of raised portions on at least one side thereof.

5. An omnidirectional neck assembly as set forth in claim 1 wherein each of said vertebra discs include a pair of raised portions on opposed sides thereof.

6. An omnidirectional neck assembly as set forth in claim 1 wherein said joint element includes at least one cutout on at least one side thereof.

7. An omnidirectional neck assembly as set forth in claim 6 wherein said at least one cutout is on a front side of said joint element.

8. An omnidirectional neck assembly as set forth in claim 1 wherein said vertebra discs are made of a rigid material.

9. An omnidirectional neck assembly as set forth in claim 1 wherein said joint element is made of a flexible material.

10. A crash test dummy comprising:
    a body;
    an omnidirectional neck assembly connected to said body; and
    said omnidirectional neck assembly comprising a plurality of vertebra segments including a plurality of vertebra discs and a plurality of ligament joints each having a joint element disposed between said vertebra discs, each of said vertebra discs having at least one raised portion on at least one side thereof with two ends being open ended to define a profile that can simulate angles of a human neck in all directions and said joint element being seated upon said at least one raised portion.

11. A crash test dummy as set forth in claim 10 wherein said at least one raised portion is generally arcuate in shape.

12. A crash test dummy as set forth in claim 10 wherein said profile varies in height with a greatest height being in a middle thereof and reducing in height toward ends thereof.

13. A crash test dummy as set forth in claim 10 wherein each of said vertebra discs include a pair of raised portions on at least one side thereof.

14. A crash test dummy as set forth in claim 10 wherein each of said vertebra discs include a pair of raised portions on opposed sides thereof.

15. A crash test dummy as set forth in claim 10 wherein said joint element includes at least one cutout on at least one side thereof.

16. A crash test dummy as set forth in claim 15 wherein said cutout is on a front side of said joint element.

17. A crash test dummy as set forth in claim 10 wherein said vertebra discs are made of a rigid material.

18. A crash test dummy as set forth in claim 10 wherein said joint element is made of a flexible material.

19. An omnidirectional neck assembly for a crash test dummy comprising:
    a plurality of vertebra discs;
    a plurality of ligament joints each having a joint element disposed between said vertebra discs;
    each of said vertebra discs having a pair of raised portions on at least one side thereof with two ends being open ended to define a profile that can simulate angles of a human neck in all directions and said joint element being seated upon said pair of raised portions; and
    said joint element including at least one cutout on a front side of said joint element.

* * * * *